J. MILLER.
Thrashing and Separating Grain.
No. 84,367.
Patented Nov. 24, 1868.
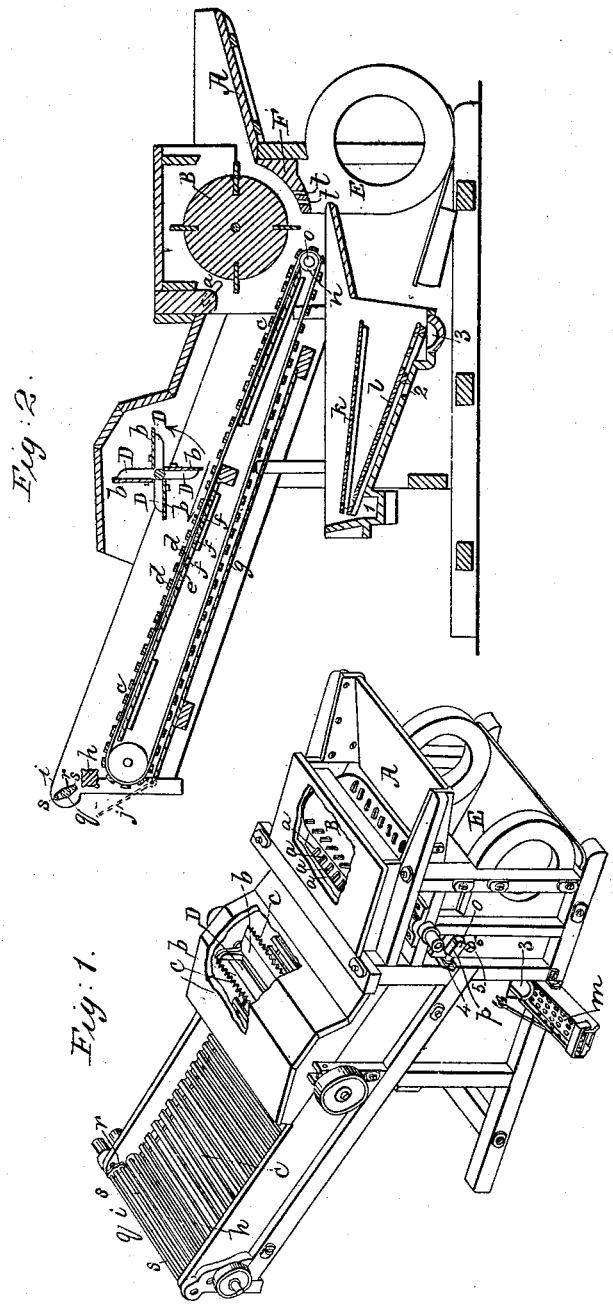

JACOB MILLER, OF CANTON, OHIO.

Letters Patent No. 84,367, dated November 24, 1868.

IMPROVEMENT IN THRESHING AND GRAIN-SEPARATING MACHINES.

The Schedule referred to in these Letters Patent and making part of the same.

*To all whom it may concern:*

Be it known that I, JACOB MILLER, of Canton, in the county of Stark, and State of Ohio, have invented certain new and useful Improvements in Machines for Threshing and Separating Grain; and I do hereby declare the following to be a full, clear, and exact description of the same, reference being had to the accompanying drawings, making a part of this specification, in which—

Figure 1 represents a perspective of the exterior of the machine, with portions broken away to show some of the interior thereof.

Figure 2 represents a longitudinal vertical section through the machine.

Similar letters of reference, where they occur in the separate figures, denote like parts of the machine in both of the drawings.

My invention consists, first, in arranging, in close proximity with the threshing-cylinder, a series of stationary teeth or cutters that will sever any and all straw that may have a tendency to wind on and thus clog said threshing-cylinder.

My invention further consists in combining with the straw-carrier a toothed beater, revolving in a direction contrary to that of the straw-carrier, so as to pick up the straw from the carrier, and raise and throw it over the beater on to the carrier, and thus shake out and separate the grain therefrom.

My invention further consists in combining, with the endless straw-carrier, a perforated board, that will prevent straw from passing through or down into the sieves, while the grain can freely pass through to said sieves.

My invention further consists in combining, with the straw-carrier, double pickers or beaters, at the upper end thereof, for making a separation of the grain and straw, and for throwing the latter free of the machine, and, incidental thereto, the construction of the upper beater of wires.

My invention further consists in supporting the lower end of the straw-carrier upon adjustable journals, and without a cross-shaft, which is much in the way, and liable to clog.

My invention further consists in a side sieve-spout for separating from the grain any short straws that may have passed through the main sieves.

To enable others skilled in the art to make and use my invention, I will proceed to describe the same with reference to the drawings.

The feeding-table A and threshing-cylinder B are arranged in the common way; and just back of the cylinder, and near to it, is placed a series of stationary teeth or cutters, $a\ a\ a$, to cut or sever any straw that may have a tendency to wind upon and thus clog the threshing-cylinder. The straw, and such grain as may remain in it, after leaving the threshing-cylinder, are received on the straw-carrier C, and carried up thereon until they reach the beater or shaking-cylinder D, which cylinder is rotated in a direction contrary to that of the moving straw-carrier, as seen by the red arrows, fig. 2; and upon the blades, $b$, of this cylinder are formed teeth, $c$, fig. 1, which take up the straw from the carrier, and throw it over the cylinder, and thus so loosening it up as that any grain remaining with the straw would be apt to be shaken out; and that the straw thus thrown over the cylinder may not pass endwise through or between the slats, $d$, of the carrier, a board, $e$, is placed between ascending and descending portions of the carrier, to catch the ends of the straw and prevent this occurrence.

This board $e$ is perforated, as at $f$, so that the grains may pass through it and fall upon the bottom board $g$, and thence pass to the sieves and shaker, and out of the machine.

The straw, after passing the beater, is carried on up by the carrier to near its extreme end, where a picker or beater, $h$, which is rapidly rotated, again shakes up the straw, so as to shake out any grain remaining in it, and the straw raised by this picker or beater $h$ is caught or taken by still another rotating beater or shaker, $i$, which, by its motion and construction, throws the straw clear beyond the carrier, while any grain that may drop from or over the extreme end of the carrier, falls upon an inclined board, $j$, (shown in dotted lines, fig. 2,) and is carried back on the bottom board $g$ to the screens $k\ l$, where it, with the other grain, is screened and divested of the chaff and other light impurities by a fan-blast, in the usual well-known way, and taken away at the points 1, 2, and 3, in different conditions or qualities, and that which passes out at 3 is subjected to a second screening at $m$, to divest it of any short straw that may remain in or with the grain.

The lower rollers or pulleys $n$, over which the bands of the straw-carrier pass, instead of being arranged on a shaft passing through the machine, and supported in its sides, are arranged upon short journals, $o$, that are supported on the outside of the frame, so as to be easily got at, in blocks, $p$, that are adjustable by means of nuts 4, and set-screw 5, and slot 6, so that the belts or the straw-carrier may be strained up when they become slack.

The use of short journals, instead of a shaft, avoids the liability of the straw-carrier's being clogged, as it would be if a shaft were used at this point by the winding up of the straw upon it.

The rotating beater or shaker $i$, which throws the straw clear off beyond the end of the straw-carrier, is made of a central shaft, $q$, connecting two heads, $r$, in which are simply round wires or rods, $s$, extending across from head to head, parallel with the shaft $q$.

From the fan-chamber E, openings, $t$, are made through the concave, F, so as to create current enough to carry off the dust from the face of the operator, and thus relieve him of much of the annoyance incident to his position and labor.

Having thus fully described my invention,

What I claim therein as new, and desire to secure by Letters Patent, is—

1. In combination with the straw-carrier, the toothed beater D, revolving in a direction contrary to that of the motion of the straw-carrier, so as to lift up and throw over the straw, substantially as and for the purpose described.

2. Also, in combination with the straw-carrier and the cylinder D, for throwing over the straw, the perforated board $e$, to prevent the straw from driving into or between the slats of the carrier, and to carry and deliver the grain to the screens, substantially as described.

3. Also, in combination with the straw-carrier, the double pickers or beaters $h$ $i$, at the upper end thereof, as and for the purpose substantially as described.

4. Also, the construction of the picker or beater $i$, viz, of the central shaft, the heads, and the rods or wires, as described and represented.

5. Also, supporting the lower end of the straw-carrier upon adjustable journals, and without a cross-shaft, as and for the purpose described and represented.

JAC. MILLER.

Witnesses:
A. B. STOUGHTON,
EDMUND MASSON.